VARIABLE EQUALIZER EMPLOYING SEMICONDUCTIVE ELEMENT

Filed Jan. 22, 1958 2 Sheets-Sheet 1

INVENTORS M. TANENBAUM
R. L. WALLACE, JR.
BY
H. O. Wright
ATTORNEY

VARIABLE EQUALIZER EMPLOYING SEMICONDUCTIVE ELEMENT

Filed Jan. 22, 1958 2 Sheets-Sheet 2

INVENTORS M. TANENBAUM
R. L. WALLACE, JR.
BY
H. O. Wright
ATTORNEY

United States Patent Office 3,022,472

Patented Feb. 20, 1962

3,022,472

VARIABLE EQUALIZER EMPLOYING SEMI-CONDUCTIVE ELEMENT

Morris Tanenbaum, Madison, and Robert L. Wallace, Jr., Warren Township, Somerset County, N.J., assignors to Bell Telephone Laboratories, Incorporated, New York, N.Y., a corporation of New York Filed Jan. 22, 1958, Ser. No. 710,558

7 Claims. (Cl. 333—18)

This invention relates to novel devices employing semi-conductive material which can advantageously be employed to simulate variable artificial lines, equalizers, and/or frequency selective networks, and to systems employing such devices.

An object of the invention is to facilitate the automatic control of the compensating devices required to maintain satisfactory overall transmission characteristics of electrical transmission systems.

A specific object of the invention is to facilitate the automatic compensation or equalization of certain types of transmission lines with respect to those changes in the transmission characteristics which result from changes in the ambient temperature to which the line is subjected.

A further object is to provide devices which will simulate adjustable networks, such as filters, artificial lines or equalizers, the adjustment of which is easily controlled, as, for example, by electrical control signals.

Succinctly stated, by way of example, certain specific illustrative arrangements of the invention are based upon the fact that the high frequency transmission characteristics of a number of present day types of transmission lines vary with temperature changes in such a manner that the variations could be accurately simulated at a constant temperature were it convenient to appropriately increase or decrease the actual physical length of the transmission line.

In accordance with this specific aspect of the invention, therefore, a device is provided at the end of a section of transmission line to accurately simulate a shorter section of the transmission line having an effective electrical length which can be readily varied over a range sufficient to compensate or equalize for all temperature variations of the line likely to result from the full range of ambient temperatures to which the line may be expected to be subjected in service.

In a specific form, for example, a compensating device of the invention is simply an elongated rectangular p-n junction arranged to serve as a variable artificial line. The p-n junction is provided with a back bias and with means for appropriately controlling the back bias in accordance with the amplitude variations of some specific frequency within the range being transmitted. A most convenience frequency, where amplitude modulated signals are being transmitted, is the carrier frequency. A more detailed discussion of these matter is given hereinbelow.

A number of widely used conventional transmission lines such as the so-called open-wire (or parallel-pair of conductors) and the coaxial line are "L—C" lines. That is to say, the distributed inductance expressed as the inductance per unit length of line and the distributed capacitance expressed as the capacitance per unit length of line are of importance in determining the transmission properties of the line. If these were the only important components in such transmission lines, the lines could be designed so that there would be substantially no loss in the line at any frequency it was desired to transmit and the problems confronting the transmission engineer would be simple indeed.

However, in addition to distributed inductance and distributed capacitance, such lines also have distributed series resistance and distributed shunt resistance. Resistive components are, of course, dissipative and consequently cause loss. Furthermore, the loss or attenuation caused by the distributed resistances of the line is different for different frequencies and varies in a complex manner which depends on the proportioning of the distributed inductance, capacitance, and resistance along the line.

At relatively very low frequencies (up to a few tens of kilocycles, for example) the distributed inductance and the distributed shunt resistance of the line are relatively unimportant and the transmission is mainly controlled by the distributed series resistance and the distributed shunt capacitance. That is to say, for the majority of practical applications the line behaves as a distributed R-C line and will under suitable terminating conditions exhibit a number of decibels of loss which is proportional to the square root of frequency and to the length of the line. This is not of paramount importance for the purposes of the present invention, however, since the invention and the majority of existing and contemplated long distance systems for transmitting intelligence are primarily concerned with operation at much higher frequencies.

At higher frequencies (about one megacycle or more, for example) the transmission properties of the line are controlled principally by the distributed series inductance, the distributed shunt capacitance, and the distributed series resistance. For the majority of practical purposes, the distributed inductance and capacitance can be considered to be independent of frequency but the distributed resistance cannot.

This is so mainly because at high frequencies currents tend to flow only in a thin layer (one "skin" depth thick) of the conductor, and since not all of the available conductive material (usually copper) is effectively used, the resistance is usually greater than at lower frequencies. The "skin" depth, that is, the depth to which current of the frequency employed will penetrate into the conductor, is determined by the resistance and permeability of the conductive material and by the frequency of the signal. In copper, for example, the "skin" depth is 0.0026 inch at a frequency of one megacycle. As the frequency of the signal increases, the "skin" depth decreases in inverse proportion to the square root of the frequency so that at four megacycles, for example, it is one-half as thick as at one megacycle, et cetera. At ten kilocycles, for instance, the "skin" depth is 26 mils, or 0.026 inch, and if the conductors composing the transmission line are thinner than 52 mils (assuming all surfaces of the conductor carry current), the signals will penetrate completely into the conductors and all of the available copper will be actively utilized in carrying the signals. At this frequency and lower, the resistance of the line will then be independent of frequency.

The frequency at which the "skin effect" begins to dominate the transmission properties of the line obviously depends on the thickness of the conductors used in the line. In a practical line, for example, in a line of the coaxial type, however, considerations of requisite mechanical strength and/or rigidity may dictate the use of conductors of such thickness that the "skin effect" is likely to be dominating at a frequency of one megacycle and higher. On the other hand, since the copper usually constitutes the most expensive part of a transmission line, whenever it is practicable to do so transmission lines are designed with a particular frequency range in mind and no more copper is provided than will effectively contribute to improved transmission over the range of frequencies it is intended to use.

The foregoing is intended as background. For the purposes of the present invention, it is sufficient to know that at the high frequencies employed for modern intelligence transmission, the transmission of a line is controlled by its distributed inductance, capacitance, and resistance. The distributed resistance, in view of the "skin effect," is proportional to the square root of the frequency being transmitted and this results in a loss for the transmission line which is proportional to the square root of the frequency in accordance with the following relation:

$$N = Kx\sqrt{f} \qquad (1)$$

where,

N is the number of decibels of attenuation, $x$ is the length of the line, $f$ is the frequency of the signal, and K is a constant determined by the proportions of the line and by the properties of the materials of which it is made.

Furthermore, the resistance of metals such as copper depends on the temperature. The change of resistance with temperature is fairly small, amounting to not more than a ten percent change over the fairly wide range of temperatures to which an aerial cable, for example, is likely to be subjected.

In spite of the fact that the change is small percentagewise, the overall effect on long transmission systems is frequently embarrassingly large, important, and difficult to correct. In transcontinental coaxial cable circuits, for example, the loss in the coaxial cables typically goes through daily changes of more than 100 decibels. In the cool part of the day the cable would, if nothing were done about it, transmit ten billion times as much power as during the warm part of the day.

If these losses and the changes in them with temperatures were equal at all frequencies, correction would be easy to achieve by conventional automatic gain control techniques. The difficulty arises from the fact that the losses at any given temperature are appreciably different for different frequencies and the number of decibels of loss changes with temperature *by the same percentage* at all frequencies.

Suppose, for example, we are considering a transmission system to work in the frequency range between one and ten megacycles and suppose that the line is such that at one megacycle, in cold weather, the loss is 100 decibels. (This would be so, for example, for a transmission line having a total length of approximately twenty-five miles of conventional three-eighths inch coaxial line, i.e. a conventional coaxial line the outer conductor of which encloses a circular cross-sectional area having a diameter of three-eighths of an inch.) If the loss at a particular temperature is 100 decibels at one megacycle, however, it will be about 316 decibels at ten megacycles at the same temperature. Accordingly, at that temperature the equalizers in the repeaters along the line will have to be so adjusted that they compensate for the difference of 216 decibels more loss at ten megacycles than at one megacycle. Furthermore, they must be very precisely adjusted so that the net loss at all frequencies in the band being transmitted is within a very few tenths of a decibel of the correct value for each respective frequency. This is difficult and expensive to achieve.

Supposing, further, that the weather changes to an appreciably higher temperature and the loss of the cable correspondingly increases ten percent. The loss at one megacycle will now be 110 decibels and the loss at ten megacycles will now be 347.6 decibels. Correspondingly, the "slope" for which the equalizers must correct is no longer 216 decibels but has increased to 237.6 decibels. To correct for this change in temperature, the gain at ten megacycles must be changed by 31.6 decibels, the gain at one megacycle must be changed by ten decibels, and the gain at intermediate frequencies must be changed precisely in accordance with the conditions existing at each respective frequency. The accomplishment of this in the past has been found to be exceedingly difficult.

Consider, for example, that it requires in the order of fifty coils and condensers to produce the correct equalization at the low temperature condition and that each of the coils and condensers has to be precisely adjusted to a specific value. A change in temperature then has the effect of making each of these fifty elements have an incorrect value. One way of correcting matters would be to make every element variable and to contrive temperature sensing elements which would measure the temperature and then, in effect, compute how much change is needed in each element and finally make the required change. This would be hopelessly complicated and expensive.

The next best thing, the thing which in fact is recognized as the best practice by those skilled in the art, is to put a number of special equalizers at intervals along the line and make them variable with temperature. The best prior art designs of such equalizers, however, leave much room for improvement in accuracy of compensation for temperature changes. In the example we are considering, i.e. for a system having a total of twenty-five miles of conventional three-eighths inch coaxial line, there might be one such equalizer and it might have between five and ten elements in it. To compensate for a change in temperature, each of these elements has to be changed by a precise amount (usually a different amount for each element). The job of doing this is exceedingly expensive, especially in view of the precision required. A system designed for television transmission, for example, must not introduce variations in transmission from the ideal value at each respective frequency over the frequency band employed of more than approximately three-tenths of a decibel for the overall system.

There is, however, an alternative approach. It should be noted, as stated above, that a change in temperature changes the attenuation by the same percentage at every frequency. This is obviously exactly the same thing that would have happened if the temperature had remained constant and the line had been changed in length by ten percent in our above-described illustrative coaxial transmission line, for example. (Stated in another way, increasing the length of the line by ten percent during a period in which the temperature did not change would clearly increase the attenuation of the line by ten percent.) We emphasize then that *a change in temperature produces just the same change in transmission as would a comparable change in the length of the line* at fixed temperature. This makes possible a very simple scheme of equalization for temperature change which, however, would be awkward to implement by any means heretofore disclosed or known in the prior art.

Considering again the above-mentioned transmission system which includes a total of twenty-five miles of three-eighths inch coaxial line, we assumed, by way of representative example, that the change in the attenuation with temperature amounted to ten percent. In view of the underscored statement immediately above, the result is the same as if, with the temperature remaining constant, the total length of coaxial line had been changed by ten percent, or by two and one-half miles.

If we were to connect into the transmission circuit an extra two and one-half to three miles of transmission line coiled up at one end of the system, that is, at one of the terminals, and assuming that we had some way of changing the length of this additional section or "stub" of line at will, as, for example, by some sort of variable tap which could be moved mechanically along the coiled section of line so that the effective length of line added could be changed to any value between zero and two and one-half to three miles, we would have means for adequately compensating for the temperature variations of the line. For example, if the fixed equalization in the repeaters is designed to be proper at some intermediate temperature when the effect of about half of the coiled stub is included, then, if the temperature of the cable goes up, we can exactly compensate for the effect by decreasing the amount of the stub in the circuit and, conversely, if the temperature falls, we can increase the amount of the stub in use. At the highest temperature we will be using substantially none of the stub or added line and at the lowest temperature we will be using substantially all of it.

In principle, this would be much simpler and easier than changing each of five to a dozen or more individual equalizer elements by precisely controlled and different amounts. Furthermore, the effect is *exactly* what is wanted and not *only approximately* what is wanted, as with the prior art types of variable equalizers.

Moreover, there is an elegantly simple means of telling just where the tap on the stub should be placed. We have shown that suitably varying the length of the stub will compensate exactly at all frequencies for the effect of a change in temperature. It, therefore, follows that suitably changing the length of the stub will compensate exactly at any one selected frequency and, consequently, if we change it to make the appropriate correction at any one frequency, all frequencies will be properly corrected.

In the case of a simple amplitude modulated signal, for example, there is immediately available a particularly suitable frequency for use in effecting the above-described correction. It is, of course, the carrier frequency which is always present and at the transmitter is always maintained at a specific amplitude. If, then, we have set the system up and effected correct equalization at some intermediate temperature, we can conveniently monitor the system for the maintenance of correct equalization by continuously observing the amplitude of the received carrier at the output end of the line.

As the temperature changes, the amplitude of the received carrier will, of course, change correspondingly. All that is then required is that the position of the tap on the line be moved in such a direction as to bring the amplitude of the carrier back to its original value. Having made this simple adjustment, we can be sure that the equalization will be just right at every frequency within the operating frequency range.

Furthermore, it is obviously a simple matter and well within the skill of the art to design a feedback or servo system which will automatically make adjustments to maintain the received carrier at a specific amplitude. A familiar example of this general type of circuit is the well known automatic volume control circuit widely used in radio receivers.

A most obvious objection to the above-described system is that two and one-half to three miles (or even a half-mile) of conventional coaxial cable having a variable tap on the center conductor would prove to be very bulky, awkward, and extremely expensive. Obviously, a small device having properties closely simulating those of the variable coiled stub would be extremely valuable.

Such a device should closely simulate the transmission properties of the transmission line to be equalized, it should be conveniently variable in length (that is, in effective electrical length), and it should be relatively inexpensive. It is a specific object of the present invention to provide just such a device.

An "R-C" line having substantially uniformly distributed series resistance and shunt capacitance has transmission properties of just the required sort for the contemplated line, or equalizer, provided proper terminations are used at each end of the line. In particular, the equalizing section of line may be driven from a source of very low impedance (nearly zero with respect to the impedance of the equalizing line itself) and may be terminated at its output end in its own characteristic impedance. If these conditions are fulfilled, the attenuation of the equalizing line is proportional to the square root of the frequency and to the length of the line. Furthermore, the effective length, that is, the effective electrical length, of the equalizing line is determined by, among other things, the capacitance per unit length.

A semiconductor element which includes a reversely biased p-n junction constitutes a device whose distributed capacitance can be readily varied by means of an electrical signal. Furthermore, assuming, for example, an elongated rectangular element having a thin p-type layer as one major surface, the remainder of the element being of n-type conductivity, the p portion of the semiconductor body adjacent to the p-n junction can be designed, as will be described in more detail hereinunder, so that it provides a resistance distributed with reference to the junction capacitance in a manner such that the overall device accurately simulates a length of R-C line. The junction is preferably designed so that the resistance in the n-type region transverse to the junction is small compared to the resistance in the p-type region parallel to the junction. An equivalent circuit will be illustrated and described in detail hereinunder. If a signal is introduced at one end of the element, it will be attenuated in the device just as it would be in a section of transmission line. Furthermore, since the capacitance of the device can be varied by changing the reverse bias of the junction, the effective electrical length of the simulated line between the above-mentioned input end and a point at a distance from that end can thus be readily varied. Because of the large longitudinal resistances that can be obtained in the thinner p-type region and the large transverse capacitance per unit area that can be achieved in p-n junctions, it is possible to simulate the effect of a mile or so of cable in a device having overall dimensions of only fractions of an inch in size. Thus the expensive, cumbersome, variable section of coiled equalizing cable discussed above can be replaced by a very small, compact, semiconductor device and the movable tap on the equalizing cable is replaced by a variable direct current power supply providing a variable back-bias voltage which varies the distributed capacity of the line-simulating junction.

Since in many coaxial line transmission systems repeaters (or amplifiers) are provided at intervals of approximately five miles, it is normally convenient to add equalization corrective devices at like intervals, particularly if, as in the case of devices of the invention, they are small and inexpensive. Accordingly, such practical considerations would indicate that devices of the invention can well be designed to equalize shorter sections, for example five mile sections, of the three-eighths inch coaxial transmission line, rather than designing a single device for the full twenty-five mile length mentioned in the systems described above.

Suitable p-n junctions can be produced by any of a number of methods well known to those skilled in the art, such as those involving impurity additions during crystal growth, and various alloying or diffusion techniques. Diffusion of a conductivity type determining impurity into a semiconductor wafer containing a predominance of an impurity of the opposite conductivity determining type is a particularly advantageous means for preparing such a structure. Diffusion techniques are, for example, described in the copending application of C. S. Fuller, Serial No. 414,272, filed March 5, 1954, now Patent No. 2,834,-696, and in his Patents 2,697,269 granted December 21, 1954, 2,725,315 granted November 29, 1955 and 2,771,-382 granted November 20, 1956. The Fuller application and patents are all assigned to applicants' assignee. By way of specific example, gallium may be diffused into an n-type silicon wafer by heating said wafer in an atmosphere containing gallium vapor. By adjusting the time of heating and the temperature of the silicon and the vapor pressure of the gallium, the thickness and impurity content of the p-type region can be varied over a wide range of values.

General considerations entering into the design of a device of the invention so that it will exhibit the specified electrical characteristics will now be discussed. The distributed longitudinal resistance of such a structure depends on the total number of impurities in the p-type layer. Consider the p-type layer as a conducting sheet that is electrically isolated from the n-type portion of the semiconductive wafer by the high resistance of the reverse biased p-n junction. Then the resistance of the p-type layer or sheet depends on the total number of uncompensated, ionized acceptor impurities and the mobility of the holes produced by these impurities. If the layer was formed by diffusing an acceptor impurity from a vapor containing a constant concentration of impurity, the concentration of acceptor impurities $N_A(x,t)$ that have diffused into the layer is given by $$N_A(x,t)=N_0 erfc\frac{x}{2\sqrt{Dt}} \qquad (2)$$

where $N_0$ is the concentration of acceptor impurity at the surface of the wafer, *erfc* is the complement of the error function, $x$ is the distance into the wafer from the surface, D is the diffusion coefficient of the impurity, and $t$ is the time of diffusion. The diffusion coefficient and $N_0$ are both functions of temperature and of the nature of the impurity. $N_0$ also depends on the concentration of the impurity in the vapor.

If the original n-type wafer contained a concentration, $N_D$, of a donor impurity, the concentration of *uncompensated* acceptor impurity $N_A(x,t)-N_D$ in the wafer is $$N_A(x,t)-N_D=N_0 erfc\frac{x}{2\sqrt{Dt}}-N_D \qquad (3)$$

Further, the conductivity $\sigma(x,t)$ of any region in the diffused layer is given by $$\sigma(x,t)=e\left(N_0 erfc\frac{x}{2\sqrt{Dt}}-N_D\right)\mu_h(x) \qquad (4)$$

where $\mu_h(x)$ is the mobility of holes and $e$ is the charge of an electron. Since the mobility depends on the total number of ionized impurities which is different in different portions of the layer, the mobility is a function of $x$.

It is convenient to specify the resistance of the p-type layer in terms of its layer or sheet resistivity, $\rho_s$, in units of ohms per square. The sheet resistance is given by the equation $$\rho_s=\frac{1}{e\int_0^a\left(N_0 erfc\frac{x}{2\sqrt{Dt}}-N_D\right)\mu_h(x)dx} \qquad (5)$$

The limits of integration are $x=0$, the surface of the wafer, to $x=a$, the position of the p-n junction. The position of the junction is determined by the position at which the concentration of acceptor impurities $N_A(x,t)$ is equal to the concentration of donor impurities $N_D$, i.e. by the equality $$N_A(x,t)=N_D \qquad (6)$$

It is evident from equality (6) and the preceding discussion that the sheet resistivity can be controlled by any one or more of the several independent variables such as $N_0$, $N_D$, D, $t$. This permits a wide variation of this quantity. Furthermore, by a judicious choice of these variables, it is possible to vary $\rho_s$ over a wide range while keeping the layer thickness, $a$, constant and vice versa. This is particularly advantageous to the practice of the presently considered invention since the layer or sheet resistance together with the distributed capacitance determines the characteristic impedance of the resulting device. The thickness of the p-type region should, for reasons already given, be maintained at a value smaller than "skin depth" at the highest frequency that is to be transmitted. Thus it is important to be able to vary the above-described two parameters independently.

The capacitance of the structure will depend on the impurity gradient at the junction and the junction's area. It has been shown by W. Shockley in his article entitled "The Theory of p-n Junctions in Semiconductors and p-n Junction Transistors," published in the Bell System Technical Journal, vol. 28, No. 3, for July 1949, equation (2.45) at page 449, that the capacitance C per unit area of a p-n junction having a linear gradient of impurity is given by the relation.

$$C=\frac{k}{8\pi}\left[\frac{4\pi ea}{3k\psi}\right]^{1/3} \qquad (7)$$

where $k$ is the dielectric constant of the semiconductor, $a$ is the value of the linear impurity gradient, and $\Psi$ is directly proportional to the applied bias.

Thus the capacitance varies as the inverse cube root of the applied voltage. In junctions produced by the diffusion process described above, the impurity concentration does not decrease linearly with distance but instead decreases as the complement of the error function as shown in Equation 2. However, solution for the linear gradient is a close approximation to the exact solution for a diffused junction. The impurity gradient at a junction diffused in the manner described above is given by $$\frac{dN_A}{dx}=-\frac{N_0}{\sqrt{(\pi Dt)}}exp(-x^2/4Dt) \qquad (8)$$

Thus the capacitance per unit area is also determined by the conditions during diffusion such as $N_0$, D and $t$.

It is assumed in the preceding discussion that only the capacity is changed as the bias is changed. In the specific device that will be described hereinunder this is a very good approximation since the p-type layer will generally be heavily "doped" (i.e. heavily charged with diffused impurities) compared to the n-type or major portion of the wafer and the space charge penetration is effectively only into the n-type portion of the wafer. If, however, the p-type layer is more lightly "doped" so that there is appreciable space charge penetration into the p-type region, then the resistance of this layer will increase significantly as the capacitance decreases. Thus is it possible to produce a structure where both the resistance and the capacitance can be varied by means of the externally applied bias voltage.

Equations 2 through 8 describe the manner in which the *specific* properties of a diffused junction are determined. In a specific structure it is obvious that the effective quantities of resistance and capacity will also depend on the geometry of the junction. For example, consider a rectangular, diffused junction of one centimeter by one centimeter in length and width, respectively, the thin p-layer of which has a sheet resistivity of 100 ohms per square. If electrodes one centimeter long were placed along opposite edges of the p-layer, the resistance between such electrodes would be 100 ohms. If, however, the junction were one-half centimeter by two centimeters in width and length, respectively, and electrodes one-half centimeter long were placed along the one-half centimeter edges of the p-layer, the resistance between electrodes would be 400 ohms. If, in the latter structure, electrodes each two centimers long were placed along the two centimeter edges, respectively, the resistance would be 25 ohms. In each of the three cases, however, the area of the p-layer is one square centimeter, and the capacities of all three structures are identical. Thus it is obvious that the geometry of the device provides a further degree of freedom for apportioning the resistance and capacitance in the most advantageous manner.

The rectangular type of structures discussed immediately above will, as will be described in detail hereinunder, simulate particular uniform transmission lines as required to equalize many practical transmission cables. It is evident, however, that numerous other shapes of structures can be made whose characteristics can be varied by an electrical signal. A number of such other structures will be illustrated and described in detail hereinunder. It will be demonstrated, for example, that widened areas of the p-layer represent regions of relatively low resistance and large capacitance while narrow regions of the p-layer represent regions of large resistance and low capacitance. The resulting equivalent circuits, accordingly, more nearly approach lumped constant structures as contrasted to the distributed constant structures discussed above. Since the capacities can be varied electrically, the frequency versus attenuation characteristic of a wave filter simulating structure, for example, can be varied electrically and particular structures of the invention may accordingly provide devices which accurately simulate electrically tunable filters.

By other geometrical manipulation, as will also be described hereinbelow, various configurations of distributed or lumped RCL circuits can be simulated, i.e. circuits including a combination of lumped or distributed resistances, capacitances, and inductances. Thus, the diffused p-n junction network simulator is readily adaptable to simulate an extensive latitude of electrical networks including those of the widely used printed circuitry type. The novel network simulator of the invention, of course, provides the additional feature that one or more of the circuit parameters can be readily varied electrically. Other advantages of semiconductor simulated network printed circuitry over the more conventional metallic printed circuits are the wide ranges of resistivity that can be obtained, making it possible to print large resistance values which are impractical with conventional metallic conductors and the large specific capacities of p-n junctions ($10^3$—$10^5$ $\mu\mu f/cm.^2$), permitting the printing of large capacities in a very small space. Thus a powerful tool is provided by devices of the invention which has outstanding merit in applications to printed circuitry and to the miniaturization of apparatus units.

Non-uniform characteristics can be produced by varying the impurity distribution instead of, or in addition to, geometrical variation. For example, it is possible to produce a different $N_0$ over different areas of a semiconductor wafer during diffusion, using masking techniques such as those described in Patent 2,802,760 granted August 13, 1957 and Patent 2,804,405 granted August 27, 1957, both to L. Derick and C. J. Frosch, assignors to applicants' assignee. This would result in differing layer depths, differing sheet resistivities and differing capacities over the surface of the wafer. Similarly, if $N_0$ were constant everywhere but the wafer contained differing concentrations of donor impurities in different regions, again an inhomogeneous structure would result. Such structures can also be produced by multiple diffusions. After the first diffusion, regions of the layer can be removed by selective etching and a second diffusion performed to produce the desired layer in these areas. It will be immediately apparent to those skilled in the art that there are numerous other possible procedures and combinations of procedures for producing diverse and varied types of structures making use of the teachings of the present application.

Other objects, features, and advantages of the invention will become apparent from a perusal of the following detailed description of specific illustrative embodiments thereof as illustrated in the accompanying drawings, and from the appended claims.

Figure 1:
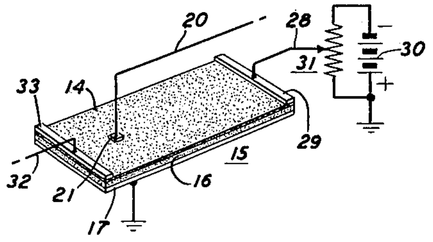
FIG. 1 illustrates in diagrammatic form a variable artificial line or equalizer simulator of the invention.

In more detail in FIG. 1, the p-n junction device 15 is shown to an enlarged scale for clarity and comprises a thin rectangular wafer of a semiconductive material, such as silicon or germanium, having a normally grounded, conductive base electrode 17 covering one major surface and two narrow transverse conductive electrodes 33 and 29 and a small square electrode 21 contacting the opposite major surface at its end edges and at an intermediate position on the longitudinal center line of the surface, respectively, as shown. The major portion 16 or "body" of the wafer is of one type of conductivity material, for example of n-type, and the major surface upon which electrodes 33, 29 and 21 are positioned comprises a very thin layer of the opposite type conductivity material, i.e. p-type when the body is n-type. Input lead 32 and output lead 20 are connected to electrodes 33 and 21, respectively. Transverse electrode 29 is connected by lead 28 to the adjustable arm of potentiometer 31. The resistive member of potentiometer 31 is shunted across battery 30, the positive terminal of the battery being grounded. It is obvious that the battery 30 provides a back-bias voltage across the p-n junction 15, the value of which is readily adjusted by moving the arm of potentiometer 31.

It will be immediately apparent to those skilled in the art that the arrangement of FIG. 1 provides a relatively large distributed series resistance contributed by the very thin p-type layer 14 between the terminals and a sizable distributed capacity between the layer 14 and the conductive base plate 17, the value of the distributed capacity being readily varied by varying the back-bias voltage from battery 30 by adjustment of potentiometer 31. The section of device 15 between terminals 21 and 29 obviously constitutes a continuation of the p-n junction which, being of the same cross-sectional size and being subjected to the same back-bias voltage as the section between terminals 33 and 21, will for all values of back-bias voltage effectively terminate the last-mentioned section in its own characteristic impedance. The distance between terminals 21 and 29 should be sufficiently large that the attenuation of the device between terminals 21 and 29 is ample to prevent any appreciable reflection of energy by the end at terminal 29 from being transmitted back to the position of terminal 21. For example, its attenuation should be between thirty and forty decibels.

Figure 2:
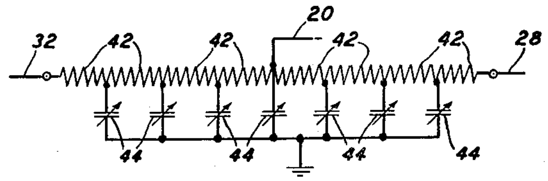
FIG. 2 illustrates in electrical schematic diagram form an R-C artificial line of the type which can be simulated by the p-n junction of FIG. 1.

The device 15, accordingly, may be represented electrically by the schematic diagram of an R-C line as shown in FIG. 2, in which the series resistors 42 represent the distributed series resistance of the p-type layer 14, and the variable shunt capacitors 44 represent the distributed variable shunt capacity between layer 14 and the conductive base 17. The attenuation of the line is proportional to the effective value of the capacitors 44.

A specific embodiment of the device 15 designed to meet particular requirements will be described in detail below in connection with the circuit diagrammatically represented in FIG. 3.

Figure 3:
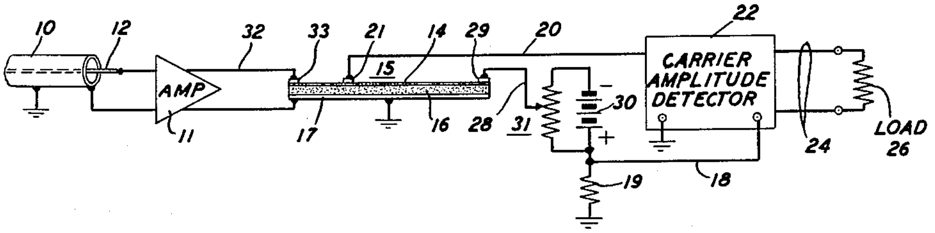
FIG. 3 illustrates in diagrammatic form a transmission system including a variable artificial line or equalizer of the invention interconnected between a coaxial transmission line and a carrier amplitude detector, the latter providing a control signal to vary the adjustment of the equalizer appropriately as the amplitude of the carrier varies.

In FIG. 3, conductors 10 and 12 comprise the outer and inner conductors, respectively, of a section of coaxial transmission line and are connected to the input circuit of an amplifier 11, as shown.

Amplifier 11 serves to connect the end of the coaxial line 10, 12, to terminal 33 and base plate 17, respectively, of device 15, device 15 being as generally described in connection with FIGS. 1 and 2. The intermediate electrode 21 of device 15 is, in FIG. 3, connected to the input of a carrier amplitude detector 22. As the name implies, a portion of the carrier frequency is detected by detector 22 and a signal proportional to the carrier amplitude is developed and fed back via lead 18 to a resistor 19. The major portion of the carrier and associated modulation products are transmitted via leads 24 to a load 26 which may represent a utilization circuit. Numerous devices suitable for these purposes are well known to those skilled in the art. Resistor 19 is connected between ground and the positive terminal of battery 30 whereby the voltage developed across resistor 19 by feedback over lead 18 is placed in series with the battery voltage selected by adjustment of potentiometer 31, thus contributing a portion of the back-bias voltage applied to terminal 29 of device 15. The overall arrangement constitutes, as discussed hereinabove, a means for automatically maintaining the amplitude of the carrier constant with variations in temperature of the coaxial line 10, 12.

As has also been explained in detail hereinabove, the variations in transmission of a coaxial line with temperature changes are of the same character as the variations which could be effected at constant temperature if it were practicable to appropriately vary the length of the coaxial line. The device 15 is accordingly designed to simulate the transmission characteristics of various lengths of the coaxial cable, the specific length at any instant being determined by the back bias applied to the device and being such that the amplitude of the carrier frequency is maintained at a predetermined value.

By way of a specific illustrative arrangement, if coaxial line 10, 12 is assumed to be a standard three-eighths inch coaxial line having a length of five miles, it will, as stated hereinabove, change over the extreme range of operating temperatures normally encountered by an aerial cable by approximately ten percent, which means that its effective electrical length will change by approximately ten percent or one half-mile. About the mean temperature this will be a maximum change of plus or minus one-quarter mile in effective electrical length.

To simulate corresponding changes in the effective electrical length of the coaxial line, the semiconductive wafer of device 15 may be of rectangular contour having a length of substantially .315 inch, a width of substantially .150 inch and a thickness of substantially .007 inch. The thin p-type layer should be substantially one mil (.001 inch) thick leaving the "body" or n-type portion six mils (.006 inch) thick. The base plate 17 can be a deposit of copper susbtantially two mils (.002 inch) thick and electrodes 33, 21 and 29 can be of aluminum approximately two mils (.002 inch) square in cross-sectional area. Electrodes 33 and 29 preferably extend completely across their respective ends of the p-type layer 14. Electrode 21 need cover only a small area, for example an area two mils square, located on the longitudinal center line of layer 14. The distance between terminal 33 and terminal 21 should be .075 inch, leaving a distance of substantially one-quarter inch between terminal 21 and terminal 29. To provide an adequate range of adjustment of the back bias contributed by battery 30 and potentiometer 31, battery 30 may preferably have a voltage in the neighborhood of fifty volts. The sheet resistivity of the thin p-type layer should be substantially 460 ohms per square. The resistivity of the body of n-type material should be substantially one-half ohm per centimeter.

The output impedance of amplifier 11 should be very low, for example about one ohm, so that the voltage delivered to simulator 15 will not be appreciably changed by changes in the impedance of the simulator. The input impedance of amplifier 11 should preferably match that of the coaxial line 10, 12.

The input impedance of detector 22 should be very high, for example 10,000 ohms, so that it will not significantly affect the impedance match between the two portions of element 15 on either side of the position of electrode 21.

The carrier amplitude detector 22 is arranged in accordance with principles well known and widely used by those skilled in the art to derive a direct current voltage proportional to the amplitude of the carrier and to apply this voltage, as described above, via lead 18 to resistance 19 in the back-bias control circuit of the p-n junction 15, which includes the steady bias (subject to adjustment) afforded by battery 30 and shunting potentiometer 31.

Load 26 may be any suitable utilization circuit such as, for example, an additional amplifier and preferably should have an impedance which matches that of the output of detector 22.

Figure 4:
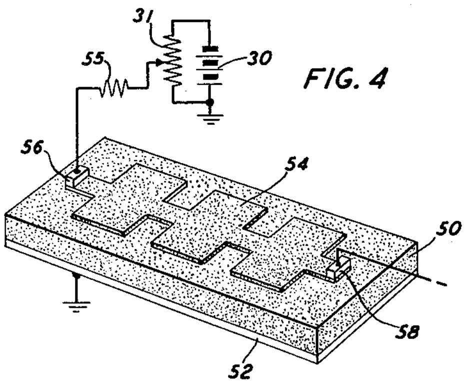
FIG. 4 illustrates another form of semiconductive network simulator of the invention.

In FIG. 4, rectangular wafer 50 is of semiconductive material of a predetermined conductivity type, for example of n-type. On the lower major surface of wafer 50 a metallic deposit 52 comprising, for example, a two mil (.002 inch) deposit of copper serves as a base electrode for the element. On the upper major surface of wafer 50 an area 54 of p-type conductivity (where wafer 50 is of n-type) having a depth of substantially one mil (.001 inch) has been created by, for example, diffusion through a mask having an opening corresponding to area 54 as taught in the abovementioned patents to L. Derick and C. J. Frosch. The broader portions of area 54 are obviously of high capacity and low resistance, while the more narrow portions of area 54 are of high resistance and low capacity. Connection terminals 56 and 58 at opposite ends of area 54 are provided by depositing a few microns of aluminum at the ends, respectively, as shown. An adjustable source of back-bias potential 30, 31 is connected through isolating resistor 55 to terminal 56. Its positive terminal and the base electrode 52 are grounded. Variation of potentiometer 31 affords adjustment of the capacities of the device.

Figure 5:
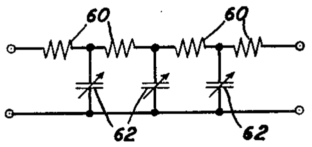
FIG. 5 is a schematic diagram of the network simulated by the device of FIG. 4.

In view of the above, the device of FIG. 4 can simulate an electrical network of the type shown in schematic diagram form in FIG. 5, where resistors 60 represent the resistances of the narrow portions of area 54 of FIG. 4 and capacitors 62 represent the capacities of the broad portions of area 54 with respect to the base electrode 52 of FIG. 4. By adjustment of the back-biasing means, 30, 31, of FIG. 4, capacitors 62 can, of course, be adjusted.

Figure 6:
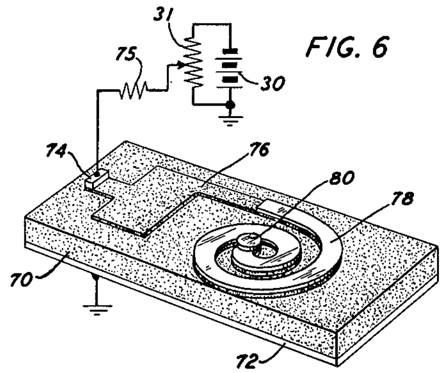
FIG. 6 illustrates a further form of semiconductive network simulator of the invention.

In FIG. 6 a still more complex area 76 of p-type conductivity has been diffused into the surface of rectangular wafer 70 of n-type conductivity. A base electrode 72 is provided by depositing a conductive metal such as copper on the lower face of wafer 70. Area 76 comprises a first narrow portion having a conductive coating or terminal connection 74, preferably of aluminum, for example, at its free end and connecting to a broad portion at its other end. The broad portion in turn connects to a second narrower portion, the other end of which connects to a spiral portion. The entire spiral portion is covered by a metallic deposit, preferably of aluminum, and its free end has a conductive terminal member 80, also preferably of aluminum. An isolating resistor 75 is employed for connecting back-bias means 30, 31 to area 76. The positive terminal of battery 30 and base plate 72 are both grounded as shown.

As for the device of FIG. 4, in FIG. 6 the narrow portions represent resistances and the broad portion represents a capacitor. The spiral portion represents a distributed inductance which has a distributed capacitance with respect to base plate 72. The metal coating on the spiral portion of area 76 reduces the resistance of the spiral to negligible proportions. It can, of course, be omitted if the distributed series resistance it would contribute is desired.

Figure 7:
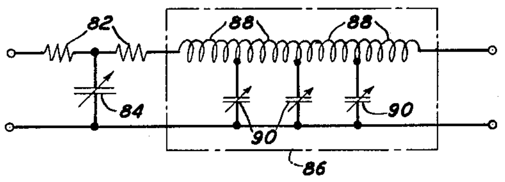
FIG. 7 is a schematic diagram of the network simulated by the device of FIG. 6.

Accordingly, the device of FIG. 6 can simulate an electrical network of the type shown in electrical schematic diagram form in FIG. 7.

In FIG. 7, resistors 82 represent the resistances of the first and second narrow portions of area 76 of FIG. 6, capacitor 84 represents the capacity of the broad portion of area 76 of FIG. 6, and the distributed L-C network 86 comprising series inductances 88 and shunt capacitors 90 represents the contribution of the spiral portion of area 76 of FIG. 6. Adjustment of the back bias by potentiometer 31 provides adjustment of the capacitors 84 and 90.

Figure 8:
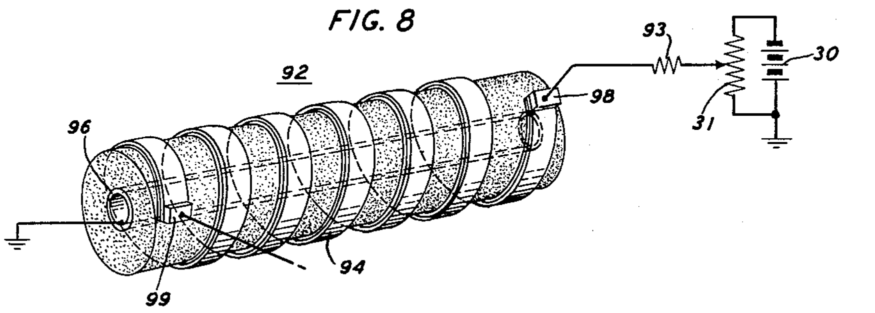
FIG. 8 is a still further form of network simulator of the invention.

In FIG. 8 a slightly different form of distributed L-C network of the invention is shown. It comprises a cylindrical member 92 of semiconductive material, for example of n-type, on which a helix 94 of opposite conductivity type. i.e. p-type, has been diffused and covered with a metallic layer, preferably of aluminum. The inner surface of the cylinder has a metallic coating 96, which may be of copper, to serve as the base electrode of the device. Terminal coatings of metal, preferably aluminum, at the opposite ends of helix 94 serve as terminals 98 and 99, respectively. Back bias 30, 31 is connected through isolating resistor 93 to terminal 98. The positive terminal of battery 30 and base electrode 96 are connected to ground, as shown. The equivalent electrical schematic diagram of the device of FIG. 8 will obviously be substantially identical to portion 86 of FIG. 7. Again the metallic coating on the helix may be omitted if the distributed series resistance of the helix is desired.

In all of the above-described semiconductive devices it is to be understood that the body of the device may be of p-type conductivity material in which case the thin diffused layers are of n-type conductivity and the polarity of the back-bias voltage source is reversed. In general it is preferable, as is well known to those skilled in the art, to employ aluminum coatings on p-type material. Copper may be employed on n-type material for most purposes.

Numerous, diverse and varied modifications and rearrangements of the illustrative arrangements described above, clearly within the spirit and scope of the principles of the invention, will readily occur to those skilled in the art. No attempt to exhaustively illustrate all such arrangements has been made.

What is claimed is:

1. In combination, a transmission line, a p-n junction, the junction comprising an elongated thin rectangular member of semiconductive material of one type of conductivity having a very thin layer of the opposite type of conductivity over the entire area of a first major surface, a conductive layer base electrode making ohmic contact with the member over the entire area of the opposite major surface, and three electrodes making ohmic contact to the ends and an intermediate point, respectively, of the very thin layer covering the first surface, back-bias means for said junction, the back-bias means being connected between a first of the end electrodes connecting to the thin layer and the base electrode and having means for adjusting its voltage over a substantial range of amplitudes, its minimum amplitude being sufficient to prevent conduction between the base electrode and all of the three other electrodes, the portion of the junction between the other of the end electrodes and the intermediate electrode electrically simulating an appreciable length of the said transmission line, the length simulated being dependent upon the amplitude adjustment of the back-bias voltage, the portion of the junction between the intermediate electrode and the first of the end electrodes simulating a length of the said transmission line sufficient at all adjustments of the back-bias voltage to effectively suppress the reflection of any energy from that end back to the intermediate electrode, an amplitude detector, a first connecting means connecting said line to said junction at said other end electrode of said junction, a second connecting means connecting said amplitude detector to the intermediate electrode of said junction, and a third connecting means connecting said amplitude detector to said back-bias means to vary the amplitude of the voltage of said back-bias means in accordance with the amplitude of signals received by said detector from said line to compensate for changes in the transmission characteristic of the transmission line with changes in temperature.

2. The combination of claim 1 in which the means for interconnecting said transmission line and said p-n junction, presents a very low impedance to said p-n junction.

3. The combination of claim 1 in which said amplitude detector provides a very high impedance to said p-n junction.

4. A p-n junction comprising a wafer of semiconductive material, said junction comprising a body portion of one type of conductivity, having a conductive base electrode making ohmic contact with the body portion, and a thin layer of the opposite type conductivity on a surface of said body portion, said layer having input and output terminals making ohmic contact with the layer and spaced from each other and a shaped contour of the part of the layer between the input and output terminals providing several portions of differing shape and area, and means for back biasing said junction sufficiently to prevent conduction between the base electrode and the other electrodes, whereby said combination can simulate the electrical characteristics of a multi-element passive electrical network.

5. The junction of claim 4, the voltage of said back-biasing means being adjustable over a range of voltage amplitudes the minimum of which is sufficient to prevent conduction between the base electrode and other electrodes, whereby said junction may simulate the electrical characteristics of any of a large number of multi-element passive electrical networks.

6. The junction of claim 5 in which one portion of said thin layer is elongated and forms several convolutions, whereby the effects of distributed inductance may be simulated by said junction.

7. A variable, transmission line simulator comprising, a p-n junction having an elongated, thin, rectangular body portion of one type of conductivity with two oppositely disposed major surfaces, a relatively much thinner layer of semiconductive material of the opposite conductivity type being formed on one said major surface of the junction, a conductive base electrode making ohmic contact over the other said major surface, three electrodes making ohmic contact to the ends and an intermediate point, respectively of the thin layer of opposite conductivity type, back-bias voltage means connected between a first of the end electrodes connecting to said thin layer and the base electrode, and means for adjusting the voltage of the biasing means over a substantial range of amplitudes, the minimum value of the range being sufficient to prevent conduction between the base electrode and the three other electrodes, the portion of the junction between the other end electrode and the intermediate electrode electrically simulating an appreciable length of a specific type of transmission line, the length simulated being dependent upon the amplitude adjustment of the back-bias voltage, and the portion of the junction between the intermediate electrode and the first of the end electrodes simulating a length of said transmission line sufficient at all adjustments of the back-bias voltage to effectively suppress the reflection of energy from that end back to the intermediate electrode.

References Cited in the file of this patent

UNITED STATES PATENTS

| | | |
|---|---|---|
| 2,102,138 | Strieby | Dec. 14, 1937 |
| 2,143,407 | Chesnut | Jan. 10, 1939 |
| 2,502,479 | Pearson | Apr. 4, 1950 |
| 2,521,507 | Dysart | Sept. 5, 1950 |
| 2,586,080 | Pfann | Feb. 19, 1952 |
| 2,666,814 | Shockley | Jan. 19, 1954 |
| 2,666,873 | Slade | Jan. 19, 1954 |
| 2,870,271 | Cronburg | Jan. 20, 1959 |
| 2,936,425 | Shockley | May 10, 1960 |

OTHER REFERENCES

Giacoletto, "A Variable-Capacitance Germanium Diode for UHF" RCA Review, vol. 17, No. 1, March, 1956 (pages 68–85).